United States Patent
Gerlach

[11] 3,875,655
[45] Apr. 8, 1975

[54] CONVERTIBLE METAL WORKING MACHINE

[75] Inventor: Hans W. Gerlach, Greenfield, Wis.

[73] Assignee: Summit Metal Fabricating, Inc., Cudahy, Wis.

[22] Filed: Oct. 29, 1973

[21] Appl. No.: 410,801

[52] U.S. Cl. .................. 29/560; 83/902; 100/103
[51] Int. Cl. ............................................ B23p 23/00
[58] Field of Search .......... 29/560, 560.1; 100/103; 83/902, 461

[56] References Cited
UNITED STATES PATENTS
2,006,889  7/1935  Frommherz ..................... 29/560
3,616,525  11/1971  Barthel ........................... 29/560

Primary Examiner—Frank T. Yosi
Attorney, Agent, or Firm—Wegner, Stellman, McCord, Wiles & Wood

[57] ABSTRACT

A metal working machine having coacting fixed and movable shear blades for shearing of metal with holders for work and other tooling associated with the shear blades for performing other metal working operations with means for modifying the operation of the machine including the stroke thereof dependent upon a particular metal working operation to be performed.

7 Claims, 8 Drawing Figures

CONVERTIBLE METAL WORKING MACHINE

BACKGROUND OF THE INVENTION

This invention pertains to metal working machines wherein the machine as basically constructed is operable for shearing metal and with maximum convenience the machine may be modified with minimum down time to provide for other metal working operations, such as punching, blanking, angle cutting, and functioning as a press brake.

Many metal working shops have a need for a metal working machine having universal utilization in order to avoid the capital expenditure for a variety of machines. The utility of such a single machine is enhanced by the number of different types of metal working operations that it can perform and with the modification of the machine to perform one or the other of the various operations requiring minimum adaptation and down time.

The prior art U.S. Pat. Nos. 3,491,643 and 3,710,665 disclose machines having the capability of shearing metal and being modified to perform another operation, however, the machines shown in these patents are quite different in design from the conventional metal working shear machine. U.S. Pat. No. 3,616,525 discloses a structure built into a machine whereby the machine may operate either to shear metal or as a press brake.

The prior art discloses the operation of switches for controlling the upper and lower postions of a movable shear blade and with adjustments to vary these positions. One example of this structure is shown in U.S. Pat. No. 2,113,115.

These disclosures do not show a structure for varying the stroke of the movable shear blade which takes advantage of the maximum force of the operating mechanism for the blade in different metal working operations.

SUMMARY

The invention disclosed herein is embodied in a metal working machine wherein the machine may be operated to perform one of many different metal working operations, with the force applied to the workpiece being maximized in all types of operations. More specifically, the machine has a fixed shear blade coacting with a movable shear blade, with the latter blade being moved by a toggle linkage, structure for adapting the machine for other metal working operations at a level higher than metal shearing, and structure for adjusting the range of operation of the machine in said other operations including an adjustment for the toggle linkage whereby the toggle linkage moves to a substantially straight-line position in all operations performed by the machine.

Another feature of the invention is to provide a machine as defined in the preceding paragraph wherein the toggle linkage is hydraulically operated, with switches for setting the limit positions for up and down positions of the movable shear blade and with coding associated with the switches and the stroke of the shear blade to facilitate location of the switches for the desired upper and lower positions for the movable shear blade in each of the various operations that can be performed.

Another feature of the invention is to mount the movable shear blade in a manner to easily obtain horizontal blade clearance with the fixed shear blade. More specifically, the movable shear blade is mounted on a ram having a carriage at each end thereof provided with rollers movable along a pair of upstanding columns of the machine frame and with said rollers being eccentrically mounted to provide for rotatable adjustment thereof to provide said horizontal blade clearance.

Still another feature of the invention is to provide for quick, simple modification of the basic shear machine to provide a number of other metal working operations wherein a back gauge movable with the ram in use of the machine in shearing is readily detachable from the machine and a workpiece-supporting table affixed to the machine and with holders mountable to the machine for supporting the necessary tooling and work for performing other operations with the holder attached to the upper movable shear blade having an upwardly open channel to fit over the upper shear blade and having an inclined bottom for engaging along the full length of the inclined shear blade while having a resulting horizontal disposition for mounting of tooling or the like.

BRIEF DESCRIPTION OF THE DRAWING

FIG. 8 is a fragmentary perspective view of the machine showing modifications thereof in order to adapt the machine to another metal working operation and, more particularly, to a metal-forming operation.

DESCRIPTION OF THE PREFERRED EMBODIMENT

Figure 1:
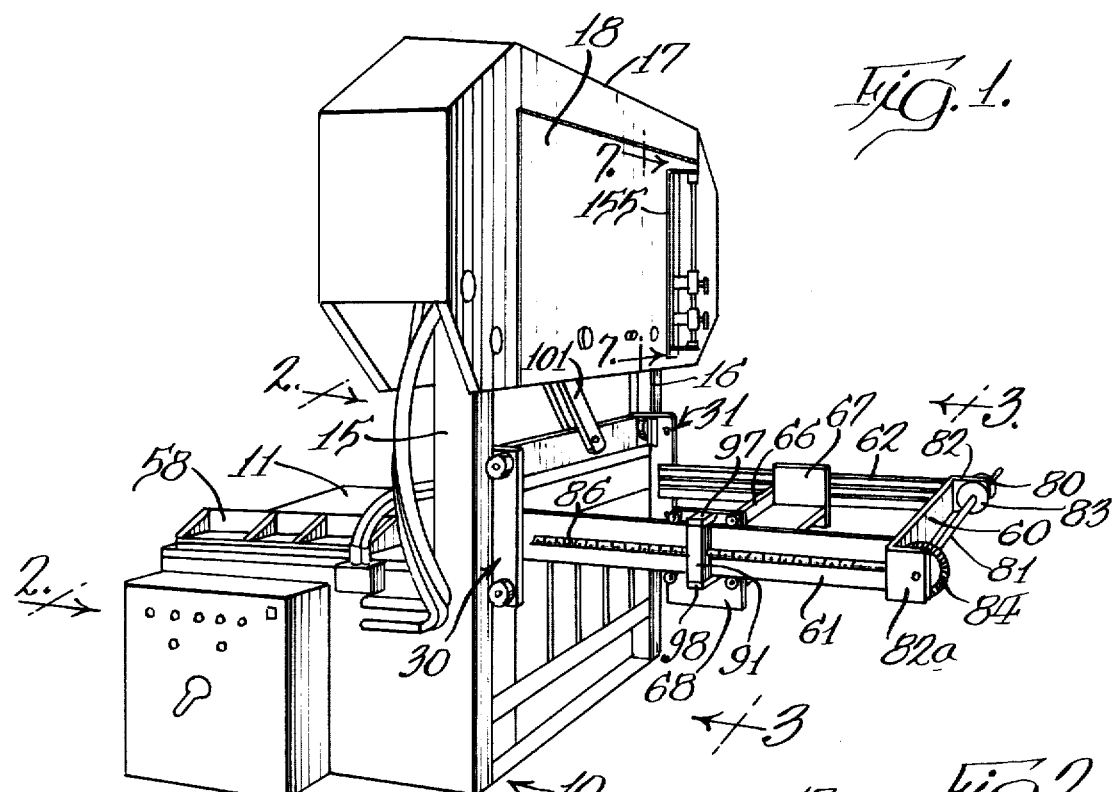
FIG. 1 is a perspective view of the metal working machine set up for metal shearing operation.

The metal working machine is shown generally in FIGS. 1 to 3 wherein a base, indicated generally at 10, has a table 11 with a pair of vertically extending, spaced-apart columns 15 and 16 associated with the base and table and sufficiently spaced therefrom to permit vertical movement of carriages and rollers associated therewith as subsequently described. The upper ends of the columns 15 and 16 are spanned by a frame member 20 which mounts operating mechanism and is enclosed by a cover 17 having a movable cover plate 18.

Figure 4:
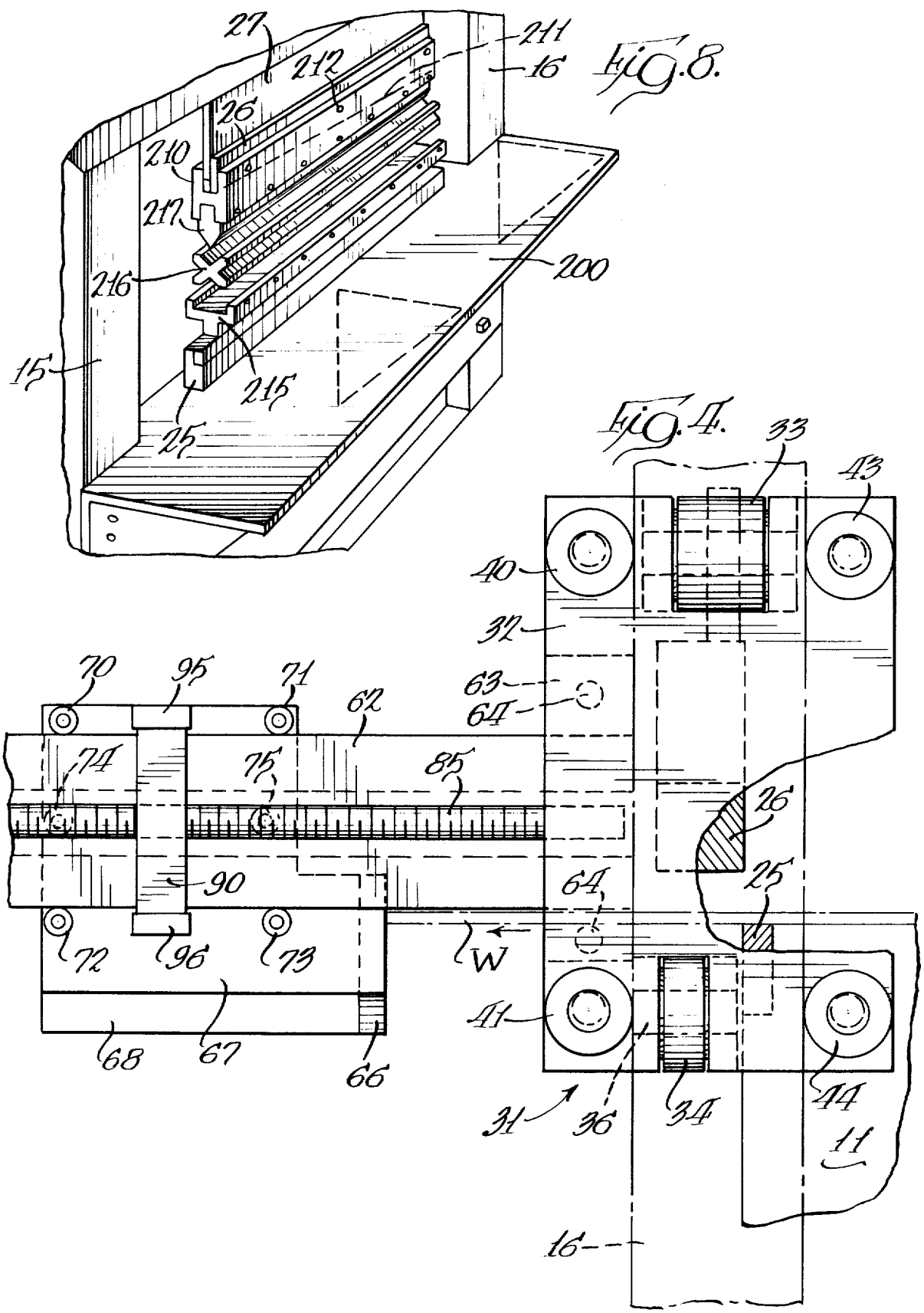
FIG. 4 is a vertical section on an enlarged scale, taken generally along the line 4—4 and with a frame column shown in phantom.
Figure 5:
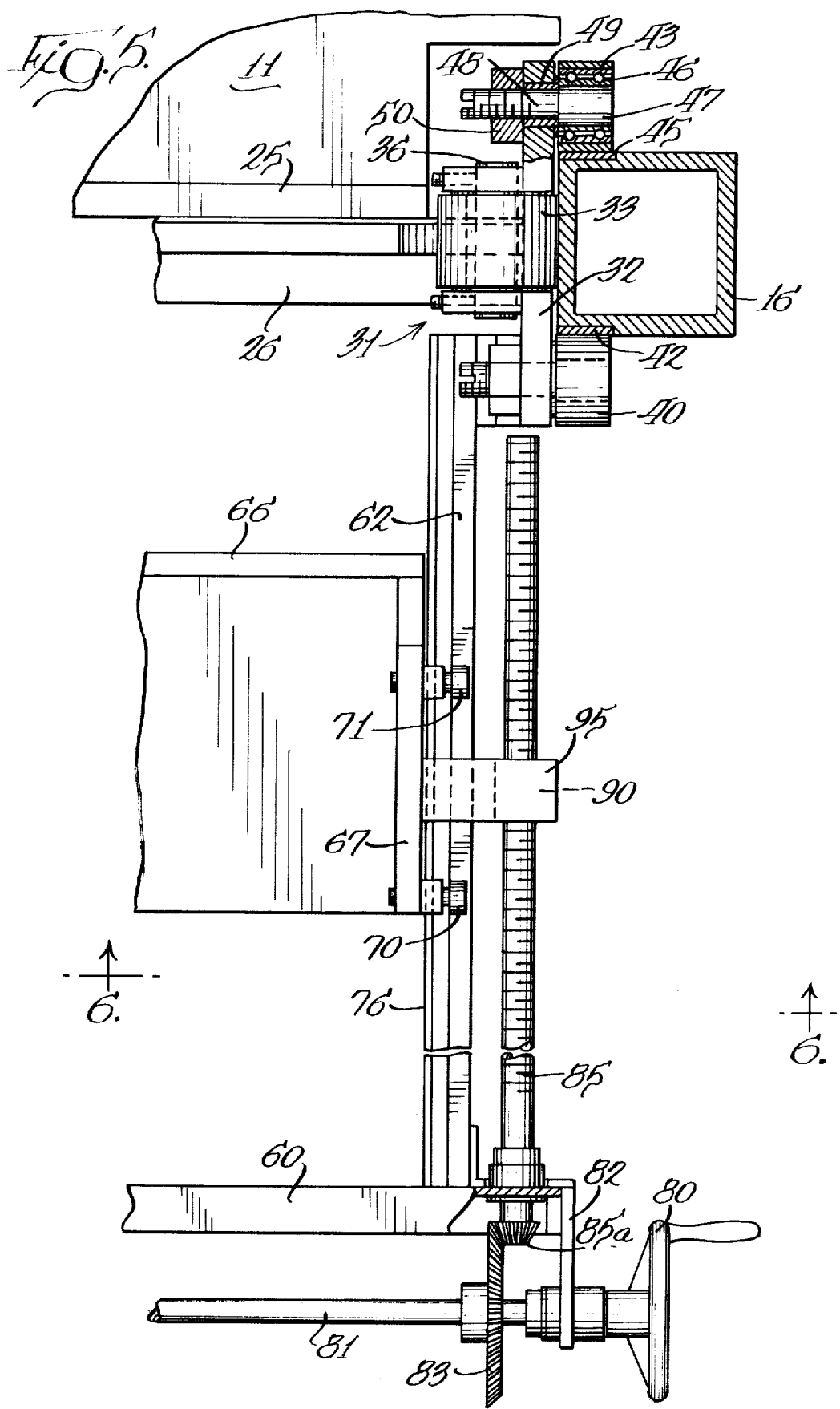
FIG. 5 is a plan section, on an enlarged scale, taken generally along the line 5—5 in FIG. 3.

The basic machine has a fixed shear blade 25 and a movable shear blade 26 (FIG. 4) with the fixed shear blade 25 being mounted to the rear edge of the table 11 and extending along the length thereof. The movable shear blade 26 is attached to a ram 27 by suitable attaching means, with the ram being mounted for up and down movement by a pair of carriages, indicated generally at 30 and 31, secured to the opposite ends thereof with the structure of these carriages being the same. Referring specifically to the carriage 31, a base plate 32 extends vertically and has a width greater than the width of the column 16. A pair of upper and lower rollers 33 and 34 (FIGS. 4 and 5) ride against the inner face of the column 16 and, in coaction with similar rollers on the carriage 30, maintain the lateral alignment of the movable ram 27. The rollers 33 and 34 are mounted in flanges protruding from the plate 32, with the upper roller 33 being mounted by a pin 36 extending through a pair of associated flanges, as shown in FIG. 5, and with the lower roller 34 being mounted by a pin 36.

The carriage 31, additionally has two pairs of rollers coacting with the column 16 to establish the horizontal blade clearance between the fixed shear blade 25 and the movable shear blade 26. One pair of rollers includes an upper roller 40 and a lower roller 41 which coact with an elongate wear plate 42 fitted in the rear surface of the column 16. A second pair of rollers 43 and 44 coact with a wear plate 45 extending vertically along the front face of the column 16. Each of the rollers are of the same construction and the roller 43 is shown in section in FIG. 5. The roller is freely rotatable by bearings 46 on a mounting shaft 47, with the shaft having a threaded eccentric stem 48 extendable through a sleeve 49 in the carriage plate 32. A lock nut 50 holds the shaft and stem in rotatably adjusted position. With this construction, the shafts 47 for mounting the rollers 40, 41, 43 and 44 may be adjustably rotated to shift the axes of rotation of the rollers and with the adjustments being made the horizontal blade clearance of the movable blade 26 relative to the fixed blade 25 can be adjusted. The table 11 is cut out at a corner adjacent each of the columns, as shown in FIG. 5, to permit free travel of the ram carriages to a level at least in part beneath the top surface of the table 11 as the carriage rollers move along the columns 15 and 16. As stated previously, the carriage 30 is of the same construction as the carriage 31 having the various rollers arranged and constructed the same as the rollers associated with the carriage 31 and with the one pair of column engaging rollers indicated at 55 and 56 which correspond to the rollers 40 and 41 of the carriage 31.

When using the machine as a shear, the operator is positioned adjacent the table 11 and may advance a sheet of metal between the shear blades, with the assistance of edge guide 58. A metal sheet W is shown extended along the top of the table 11 and between the shear blades in FIG. 4. For accurate shearing of the metal, a back gauge is provided and which is detachably associated with the machine. This back gauge includes a U-shaped frame having a plate 60 spanning a pair of side plates 61 and 62 which extend between the plate 60 and points of connection to the carriage plates 32 of the carriages 30 and 31. Referring particularly to the side plate 62, it has a vertically extending plate 63 at an inner end thereof which is releasably fastened to the carriage plate 32 by a pair of machine screws 64. A similar plate is at the inner end of the back gauge side plate 61 and is similarly secured to the plate of the carriage 30.

Figure 6:
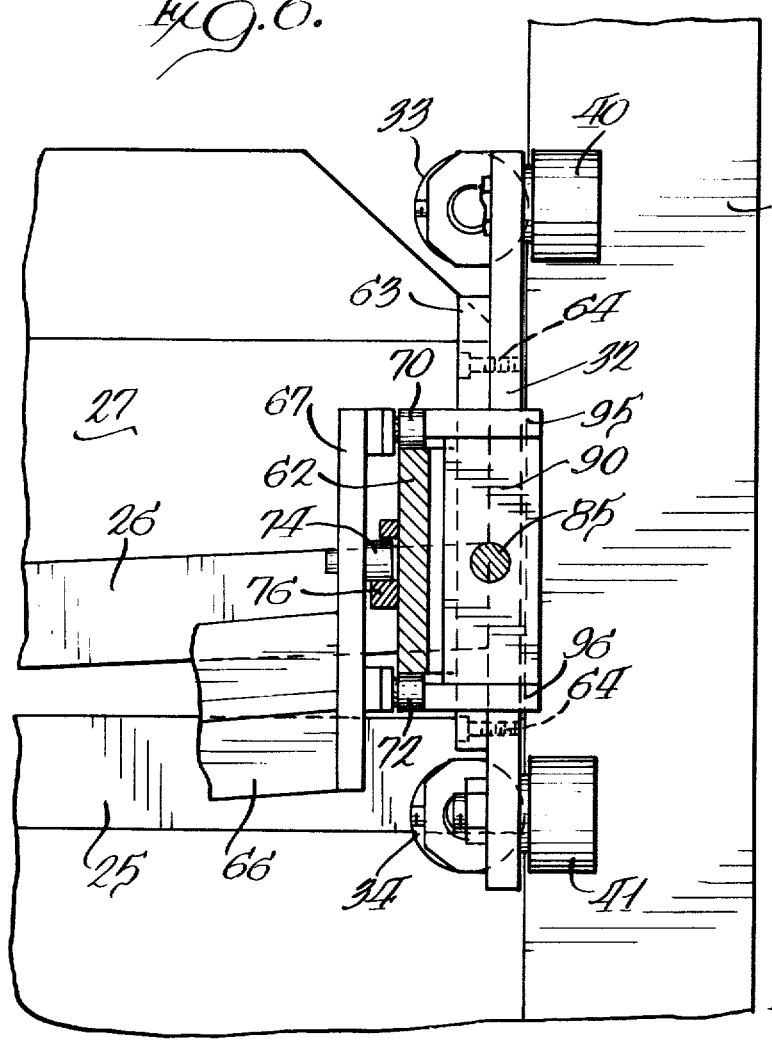
FIG. 6 is a fragmentary vertical section, taken generally along the line 6—6 in FIG. 5.

A work-engaging gauge plate 66 for the back gauge substantially spans the distance between the side plates 61 and 62 and extends vertically. This gauge plate 66 has a downward slope, from right to left as viewed from the rear of the machine and as shown in FIG. 6, and is attached at its ends to a pair of vertically extending end plates 67 and 68 which carry a plurality of guide rollers whereby the gauge plate 66 may move lengthwise of the back gauge and relative to the shear blades. The gauge plate 67, as shown particularly in FIGS. 4 to 6, has an upper pair of rollers 70 and 71 which ride along the upper surface of the side plate 62 and a lower pair of rollers 72 and 73 which ride on the under side of the side plate 62. Additionally, a pair of intermediate rollers 74 and 75 roll on a support rail 76 affixed to the inner face of the side plate 62. The rollers associated with the end plate 68 and coacting with the side plate 61 are of the same arrangement and construction as those just described, with one of the upper rollers 78 and a lower roller 79 being shown in FIG. 3.

The back gauge structure is adjustable by manual rotation of a wheel 80 which is attached to a shaft 81 rotatably mounted on a pair of flanges 82 and 82a extending rearwardly from the plate 60 and having a pair of gears 83 and 84 which engage gears at the ends of a pair of lead screws 85 and 86. As shown in FIG. 5, the lead screw 85 has a gear 85a in mesh with the gear 83 whereby rotation of the wheel 80 rotates lead screw 85. These lead screws are threaded into blocks 90 and 91 associated with the end plates 67 and 68, respectively, whereby rotation of the wheel 80 advances or retracts the gauge plate 66 relative to the shear blades, depending upon the direction of rotation of the wheel 80. The blocks 90 and 91 are positioned to a side of the side plates 61 and 62 opposite from the end plates 67 and 68 and are secured to the respective end plates by a pair of brackets 95 and 96 and 97 and 98, respectively. Rotation of the wheel 80 results in positioning the gauge plate 66 at a desired distance from the shear blades for setting the size of the part to be cut from the metal sheet W.

The ram 27 carrying the movable shear blade 26 is operated in its vertical movement by a toggle linkage, including an upper link set 100 and a lower link set 101. The toggle link set 100 at its upper end is pivoted by a pivot shaft 102 to the frame member 20. The toggle links intermediate their ends are pivotally connected together by a pivot shaft 103 which also connects to the rod 104 of a hydraulic cylinder 105 pivotally connected at 106 to bracket means 107 affixed to the upper end of the column 15. As shown in FIG. 3, the movable shear blade 26 is still above its final lower position and, in further movement downwardly thereof, the toggle linkage moves more nearly to a straight-line relation whereby maximum force is exerted on the shear blade for cutting of the metal.

Figure 2:
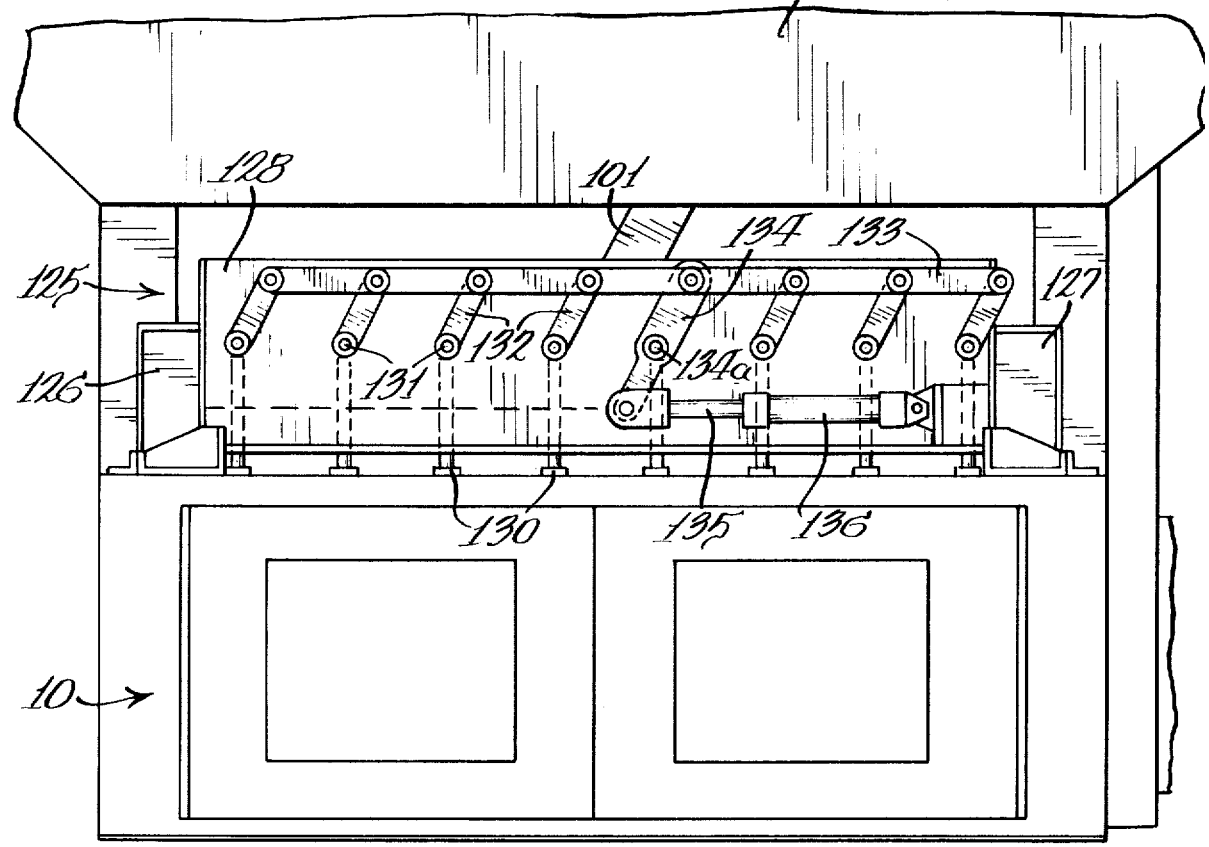
FIG. 2 is a fragmentary front elevational view, looking generally along the line 2—2 in FIG. 1.
Figure 3:
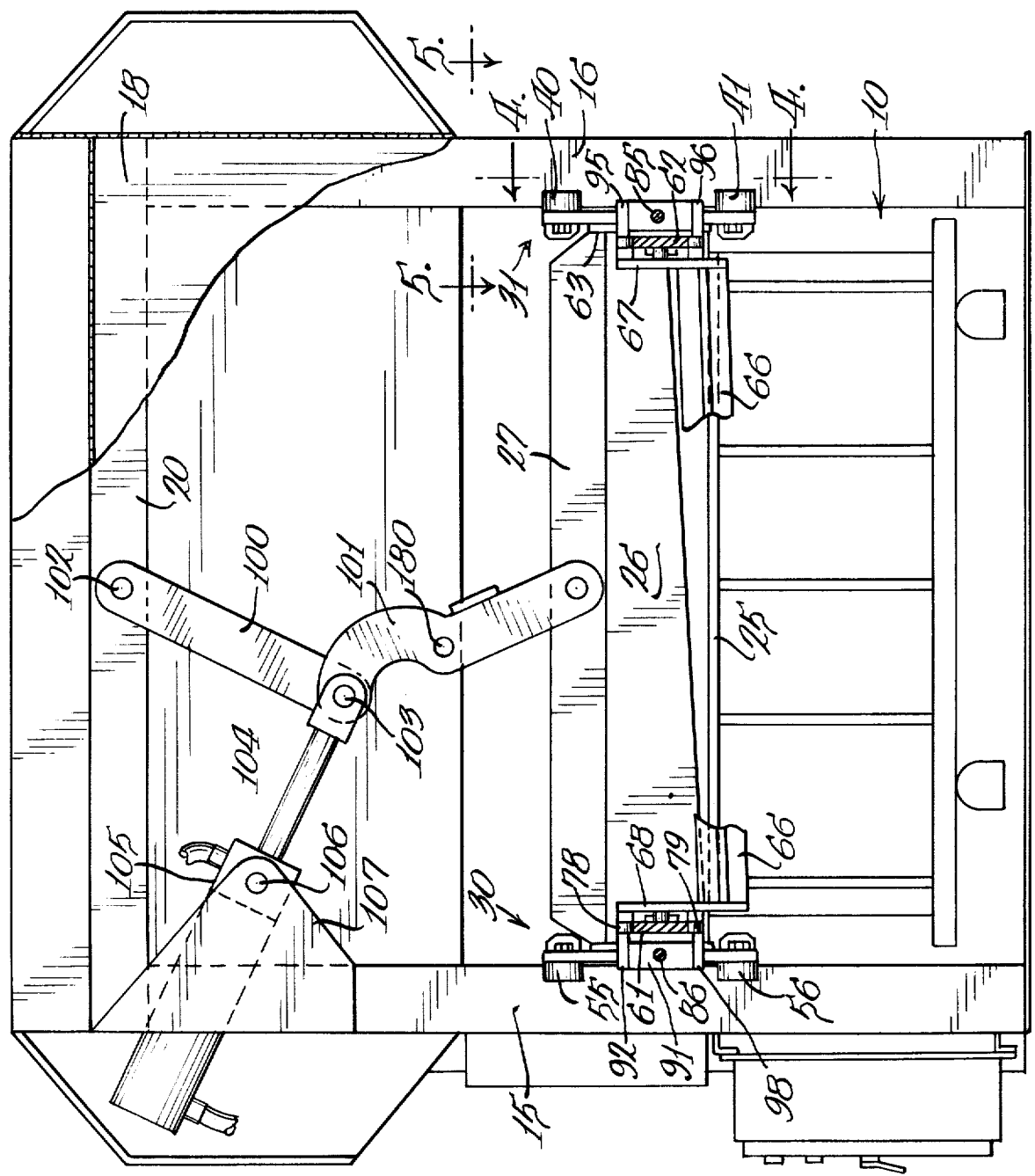
FIG. 3 is a rear elevational view, looking generally along the line 3—3 in FIG. 1, with the back gauge shown in section along the section line and with the upper cover for the machine broken away.

A hold-down assembly, indicated generally at 125 in FIG. 2, is positioned over the table 11 to hold down a workpiece W during shearing thereof. This structure has brackets 126 and 127 at the ends thereof secured to a mounting frame 128 whereby the hold-down may be detachably mounted to the machine for use only during shearing. The hold-down mechanism includes a plurality of plungers 130 mounted in the frame 128 which are urged upwardly by springs, not shown, and which are moved down into engagement with the work by rotatable cams 131 which are rotatably mounted in the frame 128 and each of which connect to an associated link 132. The links 132 are connected by an actuating bar 133 to an actuating lever 134 pivoted at 134a and connected to the rod 135 of a power cylinder 136.

As shown in FIG. 2, the piston rod 135 is extended to pivot the lever 134 and shift the actuating link 133 to a position whereby the cams 131 have urged the plungers 130 downwardly. When the rod 135 is retracted, the lever 134 pivots in a counterclockwise direction to shift the actuating link 133 to the left whereby the cams are rotated to permit elevation of the plungers 130 under actuation of the springs associated one with each of the plungers.

Figure 7:
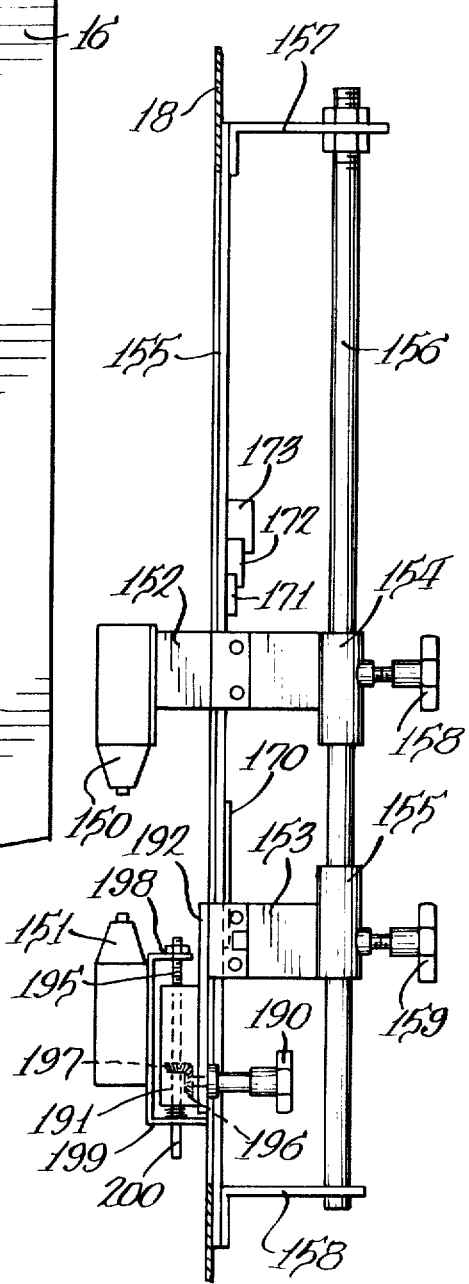
FIG. 7 is a fragmentary vertical section, taken generally along the line 7—7 in FIG. 1.

The operation of the power cylinder 105 for the toggle linkage which moves the ram 27 is under the control of an electrical circuit which may be of a type known in the art and therefore is not shown. Means are provided for establishing the upper and lower positions of the ram 27 by control of the power cylinder 105, including a pair of electrical switches 150 and 151, shown in FIG. 7. The switches 150 and 151 are positioned internally of the movable cover plate 18 and are each mounted on a holder, as identified at 152 and 153, which have a planar extent extending through a slot 155 in the cover plate. Each of the holders 152 and 153 has a tubular end 154 and 155, respectively, for movable mounting on a guide rod 156. The guide rod 156 is mounted to the cover plate 18 by a pair of brackets 157 and 158 to be positioned rigidly and at a distance from the front of the cover plate 18. Manually operable lock nuts 158 and 159 are associated one with each of the tubular members 154 and 155 of the holders, whereby the holders and the switches carried thereby may be vertically positioned to set the upper and lower position for the movable ram 27. A mechanical member (not shown) extends upwardly from the movable ram 27 with an end turned into a line extending between the switches 150 and 151 whereby the movement of the ram is translated to this mechanical member for operation of the switches.

Means are provided on the outer face of the cover plate 18 to provide guidance in setting the switches 150 and 151 for the various metal working operations that may be performed by the machine. A raised block 170 provides a visual sight guide for setting the switches when the machine is to operate at a shear, with the movable ram and movable shear blade 26 travelling to its lowermost position and elevating sufficiently high to permit positioning of a metal sheet W therebeneath. The machine may be simply modified to perform other types of operations and as guides for setting of the switches a block 171 is carried on the cover plate to indicate a range of setting of the switches for a punching operation. A block 172 indicates the range of setting positions for angle cutting, and a block 173 indicates the range of setting positions for operation as a press brake.

From the foregoing, it will be noted that the movable ram 27 operates in a much higher range of positions in operations other than shearing. To maximize the force delivered to the movable ram 27, the toggle linkage is correspondingly modified when operating in the upper range of positions. This is accomplished by having the lower toggle link set 101 provided with an alternate mounting opening 180 (FIG. 3) for receiving the pivot shaft 103 for connecting the lower toggle link set to the upper toggle link set 100 and the cylinder rod 104. This results in the toggle linkage moving to a substantially straight line position for maximum force when the ram is operating in its upper range of positions.

Additionally, the lower limit switch 151 may be given a fine position of adjustment in addition to the coarse adjustment provided by positioning of the tubular 155 of the holder by rotation of a hand wheel 190 which is rotatably mounted in a block 191 carried by depending part 192 of the holder 153. Block 191 rotatably carries a threaded shaft 195 whereby rotation of the wheel 190 rotates a gear 196 to rotate a gear 197 on the threaded shaft 195. The threaded shaft 195 is threaded into a nut 198 welded to a bracket 199 carrying the switch 151 which is guided at its lower end on a rod 200. Thus, rotation of the hand wheel 190 rotates the threaded shaft 195 to shift the bracket 199 to fine position the lower switch 151.

FIGS. 1 to 7 have fully disclosed the metal working machine with the parts that are associated therewith when the machine operates as a shear. Other uses of the machine include use as a press brake, either line or gang punching, blanking, draw forming and angle cutting. In these related uses, the back gauge is removed by removal of the machine screws 64 from the plates of the carriages 30 and 31. Additionally, the hold-down structure shown in FIG. 2 is removed. In such other operations, an operator stands adjacent the rear of the machine. Illustrative of such other operations, is the structure shown in FIG. 8, with an auxiliary rear table 200 secured to the columns 15 and 16. An upper holder 210 has an upwardly open channel for fitting onto the upper movable shear blade 26 and receiving the blade therein, with the channel having an inclined bottom 211 matching the incline of the cutting edge of the movable shear blade 26 whereby the holder fully seats against the shear blade and extends horizontally. Suitable attaching means for the upper holder 210 are indicated at 212. A lower holder 215 is suitably secured to the fixed shear blade 25 and has an upwardly opening recess to receive a workpiece 216. A forming tool 217 extends downwardly from the upper holder 210 and is suitably secured therein whereby lowering of the movable ram 27 brings the tool 217 into engagement with the work for forming thereof. With the build-up of structure, the operating range of the movable ram 27 is higher than that when the machine is used for shearing and the control switches 150 and 151 are correspondingly positioned with the aid of the guide means at the front of the cover plate 18. The guide block 171 may be used for setting of the switches. Also, the toggle linkage is connected at alternate mounting opening 180.

I claim:

1. A metal working machine having a base with a table, a frame with a pair of spaced-apart columns on the base and extending vertically above and below said table, a fixed shear blade extending along an edge of said table, a ram carrying an upper shear blade for coaction with said fixed shear blade and said upper shear blade having an inclined cutting edge to progressively shear metal, means for modifying the function of the machine to a different operation including a tool holder fittable on said upper shear blade to provide a horizontally extending tool support and a lower holder positionable over said fixed shear blade, and means for varying the upper and lower limit positions of travel of said ram.

2. A metal working machine as defined in claim 1 wherein said means for varying the upper and lower limit positions of travel of said ram includes a pair of switches positionable for engagement by a part carried with the ram, manually operable means for adjusting the location of said switches, and a cover plate for the machine having means thereon to indicate the setting of said switches for different types of metal working operations.

3. A metal working machine as defined in claim 2 wherein each of said switches is carried by a holder each of said holders having a tubular member with a manually operable clamp, a guide rod attached to said cover plate for slidably receiving said tubular members, and a slot in said cover plate in alignment with said guide rod and through which said holders extend to position said switches at the side of the cover plate opposite said guide rod.

4. A metal working machine as defined in claim 3 wherein the holder for the lower of said switches includes additional means for fine adjustment of the position of the last-mentioned switch.

5. A metal working machine as defined in claim 1 including means for reciprocating said ram comprising a toggle linkage with one link thereof pivoted to the ram and the other link pivoted to the frame, a power cylinder having a piston connected to the pivot connection between said links to move the links to a substantially straight-line relation when the machine is shearing metal, and means providing an alternate pivot connection between said links to shorten a link and have said toggle linkage move to a substantially straight-line position when the ram is moving to a different lower limit position in metal working operations other than shearing and with said lower holder positioned over the fixed shear blade.

6. A metal working machine as defined in claim 1 wherein said ram is mounted on said frame by a pair of carriages positioned one at each end thereof, rollers on said carriages engaging said columns for vertical movement of the carriages along the columns, and means for adjusting certain of said rollers relative to the associated carriage to adjust the ram horizontally and therefore the clearance between the shear blades.

7. A metal working machine as defined in claim 6 including a back gauge detachably connectable to said carriages for use when the machine is shearing metal.

* * * * *